United States Patent
Fish et al.

(10) Patent No.: US 6,490,513 B1
(45) Date of Patent: Dec. 3, 2002

(54) AUTOMOBILE DATA ARCHIVE SYSTEM HAVING SECURELY AUTHENTICATED INSTRUMENTATION DATA STORAGE

(75) Inventors: Robert Fish, Gillette, NJ (US); Dennis Bushmitch, Somerset, NJ (US); David Braun, Denville, NJ (US); Chieh-Chung Chang, Plainsboro, NJ (US); Stephen Johnson, Erdenheim, PA (US); Mahfuz Rahman, South Brunswick, NJ (US); Luyang Li, Bordentown, NJ (US)

(73) Assignee: Matsushita Electrical Industrial Co., Ltd., Osaka (JP)

( * ) Notice: Subject to any disclaimer, the term of this patent is extended or adjusted under 35 U.S.C. 154(b) by 0 days.

(21) Appl. No.: 09/934,928

(22) Filed: Aug. 22, 2001

(51) Int. Cl.⁷ .................................................. G06F 7/01
(52) U.S. Cl. ......................................... 701/35; 340/439
(58) Field of Search .............................. 701/35, 29, 33; 340/438, 439, 937; 348/143, 148, 155

(56) References Cited

U.S. PATENT DOCUMENTS

| | | |
|---|---|---|
| 5,581,464 A | 12/1996 | Woll et al. |
| 5,684,701 A | 11/1997 | Breed |
| 5,890,079 A | 3/1999 | Levine |
| 6,052,634 A | 4/2000 | Pathe et al. |
| 6,076,026 A | 6/2000 | Jambhekar et al. |
| 6,246,933 B1 | 6/2001 | Bague |
| 6,278,913 B1 * | 8/2001 | Jiang ............................ 701/35 |
| 6,282,362 B1 | 8/2001 | Murphy et al. |

* cited by examiner

Primary Examiner—Richard M. Camby
(74) Attorney, Agent, or Firm—RatnerPrestia (57) ABSTRACT

A vehicle data archive system is provided. An instrumentation interface receives at least one sensory data signal of the vehicle. A memory stores the at least one sensory data signal. A first transponder responds to a periodic provider signal of a trusted third party (TTP)/service provider for creating a corresponding shared encryption key, which is used to generate a digital signature from the stored data, the signature may be stored with the data or returned to the TTP/service provider. The signature is used to authenticate the data stored in the archive system. The encryption value used to generate the signature may be stored locally in the data archive or obtained from the TTP/service provider. The data in the data archive may also be stored without encryption. The system also allows an authorized user to delete a portion of the stored encrypted sensory data.

25 Claims, 4 Drawing Sheets

AUTOMOBILE DATA ARCHIVE SYSTEM HAVING SECURELY AUTHENTICATED INSTRUMENTATION DATA STORAGE

BACKGROUND OF THE INVENTION

The present invention relates to a data archive system for securely archiving signals, and, more particularly, to a mobile data archive system which authenticates and records operational and situational data concerning an vehicle.

Short and intermediate length road trips typically involve the use of a motor vehicle for transporting individuals/freight between desired destinations. Indeed, land-based transportation is predominantly performed by motor vehicle throughout the world. As can be appreciated, with the number of personal automobiles in particular increasing relative to the global population, and road systems straining to accommodate their increasing numbers, motor vehicle accidents are likewise increasing.

Motor vehicle accidents (i.e. collisions) may require the services of a plurality of entities such as local law enforcement agencies, private insurance companies, investigators, medical personnel and attorneys. Often times, vehicle operators or their corresponding insurance carrier will dispute the conditions and/or liability for the personal and property damage resulting from the accident; the dispute of such facts leads to a further expenditure of time and resources.

Accordingly, there is a need for a motor vehicle data archive system that can securely and reliably record and authenticate the signals of a plurality of motor vehicle sensory devices so that the conditions leading up to a motor vehicle accident can be more readily identified while simultaneously preserving the privacy of the driver.

SUMMARY OF THE INVENTION

The present invention provides a vehicle data archive system. An instrumentation interface receives at least one sensory data signal of the vehicle. The system securely authenticates and stores the at least one sensory data signal in a nonvolatile memory with a digital signature that is used for authentication purposes. The digital signature is generated using an encryption key.

According to one aspect of the invention, the data archive system allows an authorized user to selectively delete any stored sensory data.

According to another aspect of the invention, the sensory data is encrypted before it is stored using an encryption key different from the encryption key used to generate the digital signature.

According to yet another aspect of the invention, the encryption key used to generate the digital signature may be provided by a trusted third party which allows the trusted third party to certify the authenticity of the data.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

Certain terminology used in the following description is for convenience only and is not limiting. The term "vehicle" is defined as referring to any vehicle utilized for transporting an individual or object. The term "sensory device" is defined as referring to any transducer or data acquisition tool utilized for capturing a signal in relation to a situational or operational state of a vehicle or its environment. In the drawings, the same reference numerals are used for designating the same elements throughout the several figures.

The present invention provides a data archive system which can securely and certifiably record at least one sensory data signal of a vehicle in order to accurately determine the state of operation of the vehicle prior to an accident as well as the conditions leading up to the accident and, optionally, events occurring during a predetermined interval after the accident is detected. The stored data is authenticated using a digital signature developed from the stored data and a secret encryption key.

A vehicle data archive system in an exemplary embodiment of the invention is described herein. A sensory interface of the data archive receives at least one sensory data signal of the vehicle. A memory of the data archive stores the at least one sensory data signal. In one exemplary embodiment, a transponder of the data archive is responsive to a periodic provider signal of a trusted third party (TTP) or a service provider (i.e., TTP proxy). Signals provided by the TTP or TTP proxy through the transponder are used by the system to derive a shared encryption key for digital signature authentication purposes. The sensory data and signature can then be stored together. The system may use the sensory data encrypted with a further key to generate an encrypted data signature which can be transmitted to the TTP or TTP proxy using the first transponder as additional security. In this way, the signature provided to the TTP, either directly or through the TTP proxy, serves to authenticate the at least one sensory signal stored in the data archive.

I. System Components

Figure 1:
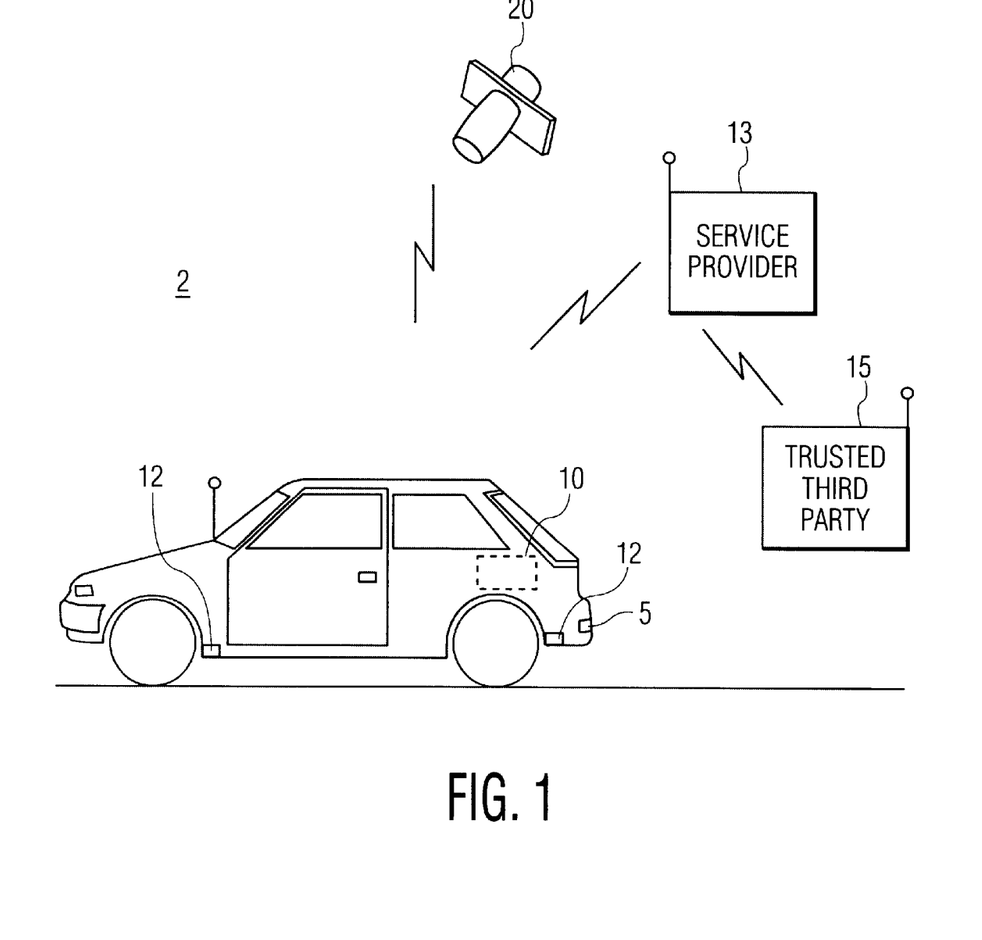
FIG. 1 is a perspective view of a data archive system of a vehicle in accordance with an exemplary embodiment of the invention.

Referring now more specifically to the drawings, FIG. 1 shows a perspective view of an exemplary vehicle data archive system (VDAS) 2 in accordance with the present invention. In the exemplary embodiment, the VDAS 2 includes a satellite signal source 20, a trusted third party (TTP) 15, a service provider 13 which may also serve as a proxy for the TTP 15, a data archive 10 located in a vehicle 5, and vehicle data sensors, generally designated 12. While the exemplary embodiment is described with reference to an automobile, those skilled in the art will recognize that the present invention is applicable to a variety of applications, mobile or otherwise, which would benefit from the secure storage of authenticated situational and operational data.

In the exemplary embodiment, the data sensors 12 may provide purely electrical data signals such as those provided by accelerometers, strain gauges and the like, or audio and video based data. For example, the data sensors may provide data on vehicle speed, acceleration, brake pedal pressure, break fluid pressure, sounds in the passenger compartment and a 360° video record of the surrounding environment of the vehicle, in addition to other sensory and situational data.

As shown in FIG. 1, the data archive 10 (shown in phantom) is operably linked to at least one vehicle data sensor 12 for receiving sensory data signals of the vehicle 5 or its surrounding environment. The data archive 10 of the exemplary embodiment is preferably housed in a sealed cabinet (not shown) and operably linked to available data sensors 12 and a power source of vehicle 5 (i.e., vehicle electrical system not shown). The sealed cabinet is desirably fire and water resistant and designed to offer significant resistance to crush forces typically encountered in catastrophic vehicle wrecks.

In accordance with the exemplary embodiment, the TTP 15, by way of service provider 13, transmits a periodic encryption signal to the data archive 10 of vehicle 5 for digital signature authentication purposes. The service provider 13 serves as a proxy between TTP 15 and data archive 10. In this way service provider 13 provides the periodic encryption signals to data archive 10 and TTP 15 remains independent. In the exemplary embodiment, a service provider 13 may include a transmitter capable of serving an entire geographical region (i.e., satellite communication) or, a network of service provider 13 may be provided to service a large geographical region. In the exemplary embodiment of the invention, the service provider 13 may provide other services such as activating an emergency transponder in the data archive 10 and/or receiving location information from the archive 10 in order to assist in locating the archive after an accident or to assist in locating the vehicle, for example, when it has been stolen.

In one exemplary embodiment of the invention, in response to the periodic encryption signal of the service provider 13, the data archive 10 derives a shared encryption key in accordance with a known algorithm for authenticating sensory data of the data sensors 12. The sensory data is stored in a memory of the data archive 10 (discussed further herein), along with a data signature. The electronic signature may be used later to verify the authenticity of the content of the data archive memory.

In another exemplary embodiment, it is contemplated that the sensory data may be stored with or without encryption and the same encryption key or another encryption key may be used to generate the digital signature value which may be stored with the data or transmitted to the service provider.

In any of the described exemplary embodiments, the memory of the data archive 10 may be cyclical, recording new information data over old data. An external event triggers the archive to preserve a predetermined amount of its content (e.g. 10 minutes prior to the triggering event and 10 minutes after the triggering event) and to generate an authenticating signature for this content.

In an alternative embodiment, data archive 10 may encrypt the sensory data with a shared encryption key that is developed from data provided by the service provider 13. In this embodiment, the encryption key may be stored by the service provider 13 in order to enable the recorded data to be decrypted.

Although the exemplary embodiments of the invention are described as using the service provider 13 acting as TTP proxy to generate the encryption key used for digital authentication purposes, it is contemplated that the sensory data may also be encrypted by other means or directly provided to data archive 10 by TTP 15. For example, the data archive 10 may include a securely stored encryption key provided by TTP proxy 13 and use this key to encrypt the sensory data. As another alternative, the data archive 10 may encrypt the data using a key that is assigned to (i.e., owned by) the driver or owner of the vehicle. If the data were encoded using a private-key public-key system, this data may be encoded using the owner's public key so that it could be decoded only by someone with access to the owner's private key. These embodiments would provide for the security where the data archive 10 may be subject to tampering. If this method is used, another key, unknown to the user or owner is used to generate the digital signature to ensure the integrity of the stored data.

A satellite signal source 20 may also be used with the exemplary embodiment of the invention to provide global positioning signals (GPS) which supply a locational and/or a temporal reference signal to the data archive 10 through a corresponding receiver. For example, the data archive 10 may determine and record a latitudinal and longitudinal location of the data archive device 10, or a time of the day from the satellite signal source 20. This data may be combined (i.e., concatenated, exclusive-or, etc.) with the sensory signal data prior to encryption and/or archiving. In an alternative embodiment, the signal of the TTP 15 or service provider 13 may be embedded in the satellite signal of the satellite signal source 20. As can be appreciated, the satellite signal source 20 and corresponding receiver of data archive 10 may be omitted to reduce the cost of VDAS 2.

Figure 2:
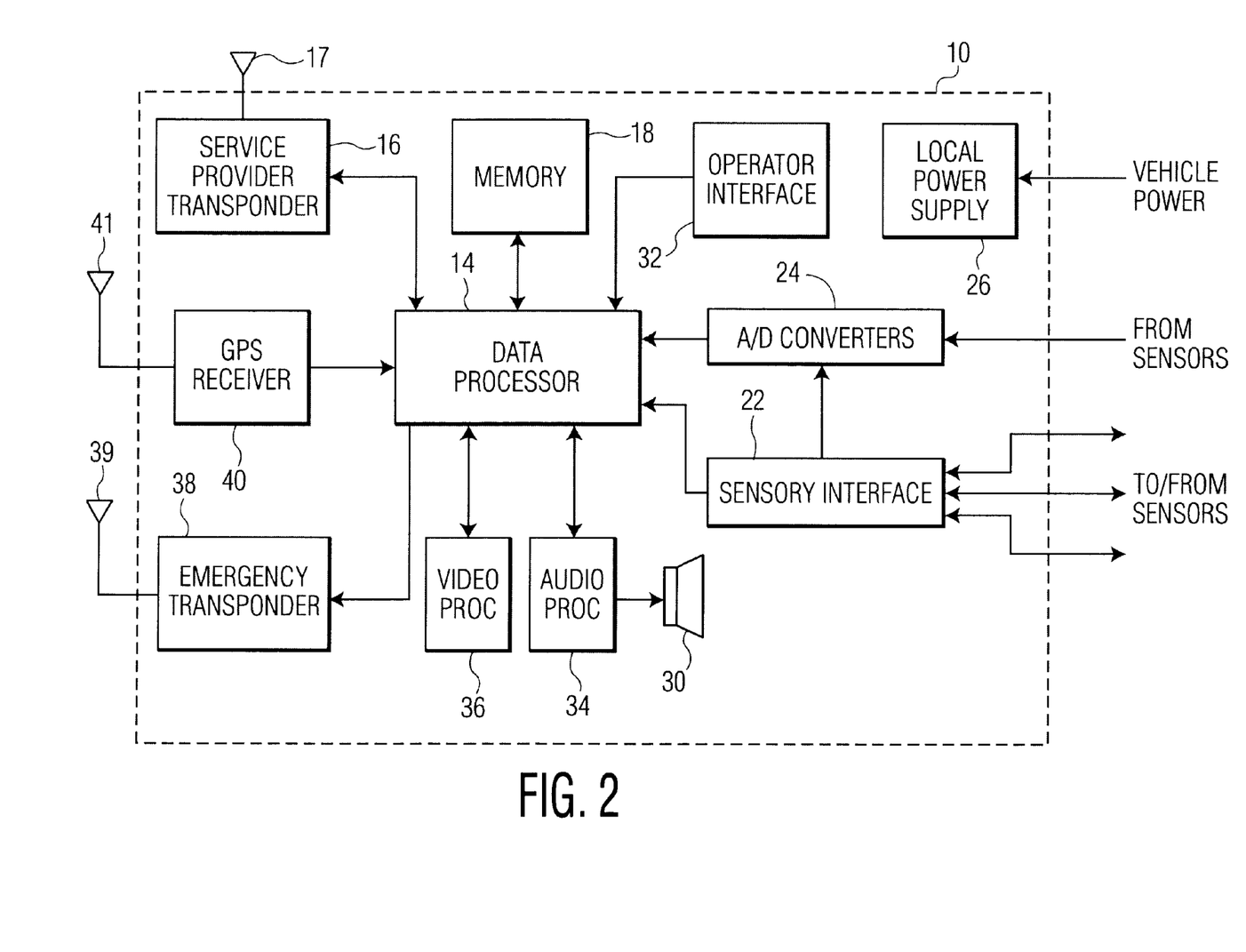
FIG. 2 is a high level block diagram of the data archive device of FIG. 1.

FIG. 2, shows a high level block diagram of an exemplary data archive 10. In the exemplary embodiment, data archive 10 includes data processor 14, service provider transponder 16, nonvolatile secure memory 18, sensory interface 22, one or more analog to digital (A/D) converters 24, local power supply 26, event monitory 28, speaker 30, operator interface 32, audio processor 34, video processor 36, emergency transponder 38, and GPS receiver 40.

In the exemplary embodiment, the data archive 10 is operably linked to an electrical system of a vehicle 5 for receiving a power signal and sensory data signals from vehicle data sensors 12 (as shown in FIG. 1). The link to the electrical system may be through a local power supply 26 of the data archive 10, as shown in FIG. 2. To simplify the drawings, the power connections between the local power supply 26 and the elements of the data archive 10 shown in FIG. 2 are omitted. The local power supply 26 is configured to provide operational power to the data archive 10 from the vehicle power signal while the vehicle electrical system is operable and to provide power from a battery (not shown) if the vehicle electrical system fails.

In the exemplary embodiment, the service provider transponder 16 of data archive 10 is a radio-frequency (RF) communication module. The encryption signal of TTP proxy 13 may be a satellite radio signal or a cellular telephone signal or other broadcast signal. Those skilled in the art will recognize that service provider transponder 16 may be an analog receiver or a digital receiver. The service provider transponder 16 includes an antenna 17 for detecting and transmitting data. In one exemplary embodiment of the invention, the service provider transponder 16 provides data that is used by the data processor 14 to generate a shared encryption key which is shared with the TTP proxy 13. In an alternative embodiment of the invention, the service provider transponder 16 both receives data from, and sends data to the service provider 13. Data transmitted to the service provider 13 may include, for example, an electronic signature derived from the sensory data signals and location data. The signal received from the service provider 13, enables the data archive 10 to derive a shared encryption key in accordance with a known algorithm described herein. Those skilled in the art recognize the data archive may be integrated with a mobile audio/video device that provides entertainment and informational content to the driver.

In one exemplary embodiment, the shared encryption key may be based on Diffie-Hellman key exchange algorithm.

The Diffie-Hellman algorithm is described in U.S. Pat. No. 4,200,770 entitled CRYPTOGRAPHIC APPARATUS AND METHOD. Alternatively, other known methods for generating a shared encryption key may be used. The shared key used for digital signature purposes may be negotiated between the data archive 10 and the TTP 15 using data provided by the service provider 13, acting as a TTP proxy. The sensory data signals can then be encrypted by the shared key and transmitted via the service provider transponder 16 to TTP proxy 13 and then to the TTP 15 to serve as a digital authentication signature value. This signature is stored either by the TTP 15 or the service provider 13.

In the one exemplary embodiment of the invention, the signal that is transmitted to the service provider 13 may be a hash function value generated from the stored data and encrypted using the shared encryption key. The hash function value may be combined with other signals (i.e., concatenated, exclusive-or, etc.), for example, a time value provided by the GPS receiver 40, to provide a time reference for the signature. In the exemplary embodiments of the invention, no data concerning the operation, situation or location of the vehicle is sent to the TTP proxy 13. The hash function value operates only as a check-sum value to allow the data recorded in the secure memory 18 to be certified if it is needed for official purposes, for example, as evidence in a legal proceeding.

In an alternative embodiment, the data archive 10 may not send a digital signature to the service provider 13 but may encrypt and record the sensory data signals as composite sensory data signals, concatenated with temporal and/or cartographic reference data from the GPS signal using a secure encryption key. In this embodiment of the invention, the ability to certify the data would depend on the ability to certify the integrity of the secure encryption key, the physical security of the data archive device 10 and the security of its operation. The secure encryption key may be stored locally or derived from a signal provided by the service provider 13.

The data archive 10 of the exemplary embodiment may receive control parameters from operator interface 32 to delete portions of the data stored in secure memory 18, deactivate local power supply 26, deactivate GPS receiver 40, or to completely deactivate data archive 10 where increased privacy is desired. The operator interface 32 or "controls" of data archive 10 provide an operator means for adjusting/controlling the operation of data archive 10. In an exemplary embodiment, the controls 32 are push-button switches, however those skilled in the art will recognize that the function of controls 32 can be performed by any number of switching technologies including a wireless communication device (not shown). Moreover, the controls may be physically located on the data archive 10, or positioned at a readily accessible location of the vehicle 5, such as an area of the passenger or engine compartments.

The ability to delete portions of the data stored in the secure memory 18 provides the owner or driver of the vehicle 5 with a way to control access to the recorded data. Thus, the driver or owner may control how and when the data is used even if he or she can not directly decrypt the data. To ensure that data is not deleted accidentally, however, it is contemplated that the user may be required to enter a password or personal identification number (PIN) via the operator interface 32 before being allowed to delete any data. It is also contemplated that the data archive 10 may require the user to confirm any command to delete the data before the data is actually deleted. In the exemplary embodiment, the memory of the data archive 10 is cyclical, an external event triggers the memory to preserve a predetermined amount of its contents (i.e., data recorded 10 minutes prior to external event and 10 minutes after event).

The sensory interface 22 is provided for signal conditioning and pre-processing of the sensory data signals of vehicle data sensors 12 of vehicle 5. In an exemplary embodiment, the sensory interface may include circuitry for as known to those skilled in the art for such functions as impedance matching, amplitude and/or frequency modulation, noise suppression, electrical isolation, wave shaping and the like (not shown). If for example, the sensory data is from a microphone in the passenger compartment, the sensory interface 22 may include a compressor preamplifier to ensure that even relatively low-level sounds can be digitized by the analog-to-digital (A/D) converters 24, processed by the audio processor 34 and recorded in the secure memory 18.

The sensory interface 22 may also receives signals that are relayed directly to the data processor 14 as single events, for example, a change in status of the headlights or windshield wipers or an indication that the airbag has been deployed. These events may interrupt the processor 14 or may simply change a bit in a register (not shown) that is periodically polled by the processor 14. Events such as the deployment of the airbag which indicate that an accident has occurred may be used as "halting events" which initiate the preservation of the stored sensory data and the generation of the digital signature.

In the exemplary embodiment, the data archive 10 receives audio and or AV signals from sensors 12. A/D converter 24, audio processor 34 and video processor 36 enable appropriate processing of these sensory data signals and facilitate their storage in secure memory 18. Audio and video signals may be received from sensors 12 such as a video camera (not shown) and a microphone (not shown), processed by the sensory interface 22, for example, to ensure that they have appropriate dynamic range, digitized by the A/D converters 24 and stored into a buffer area (not shown) of the secure memory 18. The stored audio and video signals are continually retrieved from the buffer area by the audio processor 34 and video processor 36.

The audio processor 34 and video processor 36 may include, for example, coder-decoder (codec) systems that compress the respective audio and video signals so that they may be efficiently stored into the secure memory 18. If moving video images are captured and stored, the video processor 36 may include a moving pictures experts group codec (i.e. MPEG-1, MPEG-2, MPEG-4, MPEG-7, or MJPEG) or a codec that compresses video data into any of a number of commonly used video formats such as digital video (DV), Quicktime™ or RealVideo™ formats. If only still images are captured and stored, the video processor may implement a joint pictures experts group (JPEG) codec, a graphic interchange format (GIF) codec or any of a number of other widely used still image compression formats. The audio processor may include any of a number of widely used audio codec such as MPEG1, level 3 (MP3), RealAudio, or a multichannel codec such as an AC3 codec. The multichannel codec may have advantages in providing information that allows sounds in the passenger compartment or outside of the vehicle to be localized.

In the exemplary embodiment of the invention, the data processor 14 may exchange control information and data with: the service provider transponder 16, secure memory 18, sensory interface 22, analog to digital (A/D) converter 24, audio processor 34, video processor 36, emergency transponder 38, and GPS receiver 40 as indicated via the solid lines. The data processor 14 may also provide control signals to the sensory interface 22 and A/D converters 24 to control the timing of the digitization and storage of various sensory values.

The secure memory 18 of data archive 10 is provided for receiving and storing sensory data signals of the vehicle data sensors 12 of vehicle 5. In the exemplary embodiment, the secure memory 18 is a removable non-volatile memory device such as a secure digital (SD) memory device or any of a number of other commercially available non-volatile memory devices. The exemplary secure memory 18 is removable to allow for easy access to the data after an accident. It is contemplated, however, that a non-removable memory may be used and facilities (e.g. an external port) provided to directly read the contents of the memory without removing it from the data archive 10. The memory may be arranged as a circular buffer to allow content to be stored continuously, with the newer content overwriting the older content. Although the secure memory 18 is described as being a non-volatile memory, those skilled in the art will recognize that volatile memory devices such as a battery-backed DRAM may also be used. To ensure that at least one valid record exists at the time of an accident, the circular buffer may be configured to store multiple sensory data records, each representing data stored during a predetermined interval (e.g., 15 seconds). Thus, if the recording of data is interrupted by the accident, the previously recorded record is still available for authentication purposes.

Although the primary function of the secure memory 18 is to store the operational, situational and environmental data derived from the sensors 12, In the exemplary embodiment, a portion of secure memory 18 is reserved for use by the data processor 14 to enable GPS functionality, sensory data signal conditioning, and audio/video processing functionality. In this embodiment, cartographic content may be preloaded into the secure memory 18 upon manufacture for use in conjunction with data processor 14 and GPS receiver 40 for identifying a cartographic location corresponding to latitude and longitude coordinates derived from the GPS signal.

The GPS receiver 40 provides both locational and temporal signals. These signals and the means for providing them are well known as commercial GPS receivers are widely available. As described above, the GPS receiver 40 may receive a GPS signal for identifying the latitudinal and longitudinal coordinates of the data archive 10 which may be translated to a geographical location if the secure memory 18 is preloaded with cartographic content. Alternatively, the latitude and longitude values derived from the GPS signal may simply be recorded. In another alternative, the data archive 10 may ignore the coordinate data provided by the GPS signal and use only the temporal signals. In yet another embodiment, the GPS receiver 40 may be absent from the data archive 10.

When the secure memory 18 is preloaded with cartographic content, the position of the vehicle may be indicated textually, with reference to particular roadways, for example "south on U.S. route 1, five miles south of State Street." Alternatively, a graphic image, as would be displayed by a conventional GPS system, may be provided to the video processor 36 via the video buffer (not shown) in secure memory 18, where it is compressed and stored in the circular buffer area (not shown) of secure memory 18.

The local power supply 26 of the exemplary embodiment, serves to power data archive 10 where vehicle power has been removed (i.e., when changing the vehicle battery, or when the vehicle electrical system is damaged). Upon loss of vehicle power, speaker 30 may be utilized to produce an audible siren to alert the operator that local power supply 26 has been engaged and to serve as an audio beacon to locate the data archive 10 after an accident. If power is disengaged in the process of performing a repair, the operator may, through operator interface 32 disengage the local power supply 26 until vehicle power is restored. If the local power supply 26 is not disengaged, the local power supply 26 may initiate emergency transponder 38 to provide a signal for locating the data archive 10. This enables investigators to locate the data archive 10 if it becomes separated from the vehicle 5 by catastrophic impact (described below). The local power supply 26 may be a rechargeable power supply such as a nickel-metal hydride or lithium ion cell. In the exemplary embodiment the power supply 26 of data archive 10 may be recharged by the power signal of vehicle 5.

The emergency transponder 38 of the exemplary embodiment, is provided for locating the data archive 10. For example, in a catastrophic vehicle collision, data archive 10 may be separated from vehicle 5. Once the vehicle power source is disconnected, the emergency transponder 38 produces an audible signal via speaker 30 to alert an operator of a power interruption and that local power supply 26 is being utilized. After a predetermined period, the audible signal is discontinued an electronic beacon signal of emergency transponder 38 is actuated. In the exemplary embodiment, the electronic beacon signal may be a signal such as that emitted by an Emergency Position Indicating Radio Beacon (EPIRB) or a proprietary system such as LOJACK®. In an alternative embodiment, the emergency transponder 38 of data archive 10 may be remotely activated by the service provider 13, where the vehicle has been stolen or otherwise lost. For example, a vehicle operator may report his vehicle stolen to a law enforcement agency, the agency may then notify TTP 15 or service provider 13 to activate the emergency transponder 38. Those skilled in the art will recognize that any number of transmission frequencies/protocols may be utilized by emergency transponder 38.

As an alternative to the emergency transponder, the vehicle 5, upon engaging the local power supply 26 for a predetermined interval after loss of vehicle power, may transmit locational data derived from the GPS signal provided by GPS receiver 40 to the service provider 13 via the service provider transponder 16. This may be accomplished, for example, by concatenating the locational data to the signature data or other data that is transmitted to the service provider 13. In this embodiment of the invention, while data archive 10 may stop collecting data when the system detects that an accident has occurred, it does not stop sending location data to the service provider 13.

III. Service Provider

A. TTP 15

Figure 3:
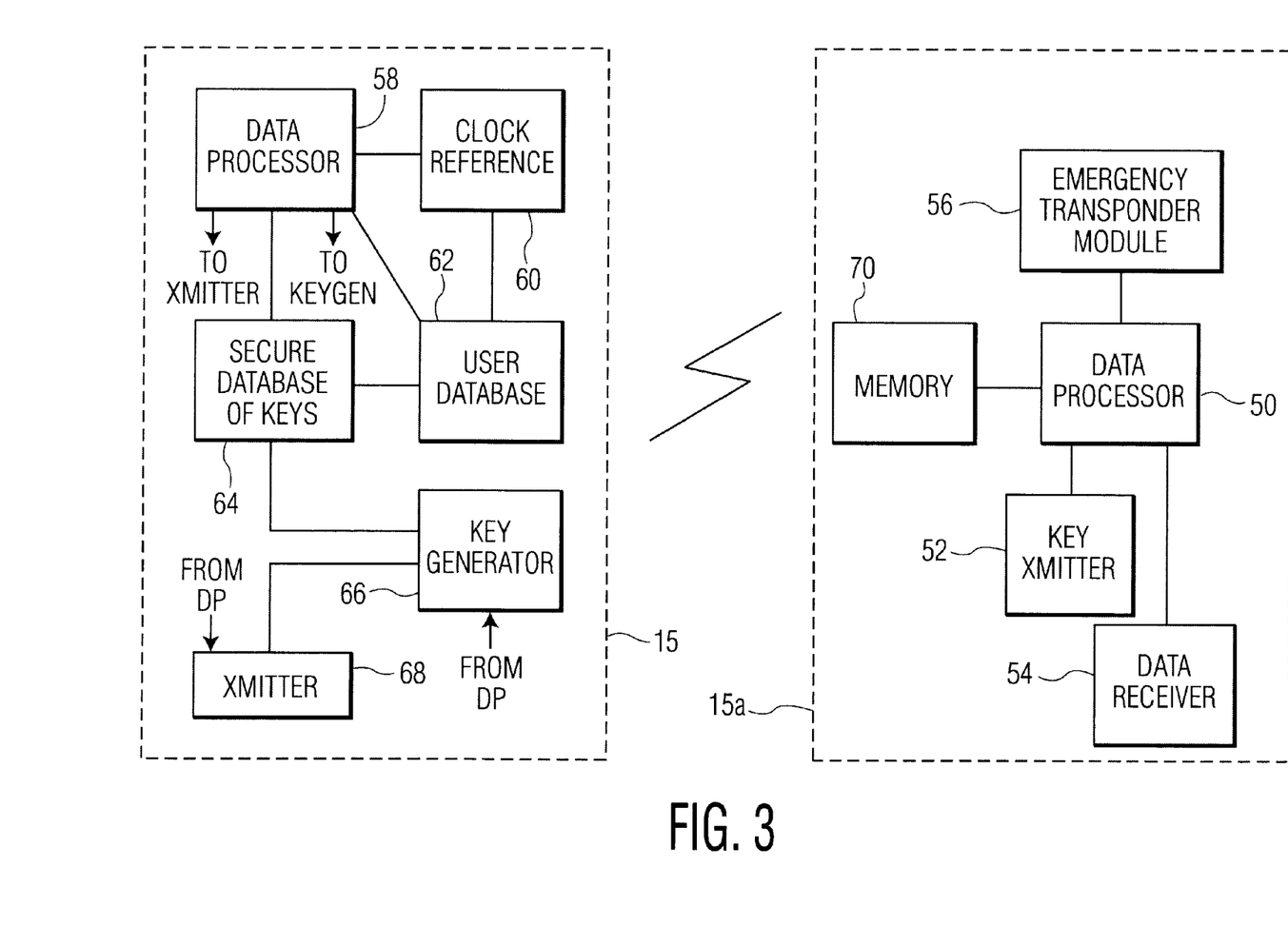
FIG. 3 is a high level block diagram of the provider station and service provider of FIG. 1.

Referring now to FIG. 3, in an exemplary embodiment, trusted third party (TTP) 15 may include, for example, a data processor 58, a clock reference 60, user database 62, secure database of keys 64, key generator 66, and transmitter 68. The contents of the TTP 15 of the exemplary embodiment, are read/write protected and access to the TTP database is similarly limited to authorized personnel.

The transmitter 68 of the TTP 15 may be combination transmitter and receiver (transceiver) for communicating directly with the data archive 10 to generate the shared encryption key and receiving electronic signature data from the service provider 13 or directly from data archive 10. In the exemplary embodiment, the transmitter 68 of TTP 15 may be an RF transmission source such as that utilized by cellular telephones, however the present invention is not limited to any specific carrier type/frequency. For example, in an alternative embodiment, a satellite radio signal may be used by transmitter 68 where the communication portion of the TTP 15 is an orbiting satellite. Similarly, a special communication authorization (SCA) signal may be used by transmitter 68 of the service provider where the TTP 15 utilizes bandwidth of an FM radio station. In this embodiment and in any of the other embodiments, the signal transmitted from the data archive 10 to the TTP 15 either directly or through the service provider 13, acting as a TTP proxy, may be on a different frequency or by a different method (e.g. cellular communication to prevent any interference with the commercial FM radio band when the service provider signal is sent using SCA).

In the exemplary embodiment the transmitter 68 of the TTP 15 periodically transmits an encryption signal to the service provider 13 which in turn, relays the periodically transmitted encryption signal to data archive 10. The periodic encryption signal may be transmitted (for example every 5 seconds) to provide a different encryption key to the data archive 10.

The secure database of keys, 64, user database 62 and key generator of the exemplary embodiment may cooperate to provide the shared encryption key based, for example, on the Diffie-Hellman key exchange algorithm. The secure database of keys 64 providing variable data for key generator 66, the user data base containing the identity of users of the VDAS system 2.

Clock reference 60, may provide a temporal reference signal to data archive 10, for time stamping data and/or to TTP 15 for tracking the timing of key generation. Alternatively, the clock reference may transmitted along with the periodic encryption signal to service provider 13 or directly to data archive 10. In embodiments of data archive 10 employing a GPS receiver 40, the transmission of the clock reference signal may be omitted as a common clock reference signal may be derived from the GPS signal by both the TTP 15 and the data archive 10.

In the exemplary embodiment, data processor 58 of TTP 15 may exchange control information and data with: clock reference 60, user database 62, secure database of keys 64, key generator 66 and transmitter 68 as indicated via the solid lines. Specifically, the data processor 58 manages the generation of the periodic signal. It may also provide control signals to the clock reference 60 and key generator 66 to generate the periodic encryption signal.

B. Service Provider 13

As shown in FIG. 3, in an exemplary embodiment, the service provider 13 includes a data processor 50, a key transmitter 52, a data receiver 54, emergency transponder module 56 and memory 70.

The data processor 50 of service provider 13 communicates control information with emergency transponder module 56, key transmitter 52 and data receiver 54. Specifically, the data processor 50 provides control data to key transmitter 52 and to emergency transponder module 56 for remotely activating an emergency transponder 38. The data processor 50 may determine, for example, when to initiate periodic communication via key transmitter 52 (i.e., frequency of transmission/reception) in accordance with an instruction set.

Emergency transponder module 56 is utilized to generate a remote activation signal for enabling an emergency transponder 38 of data archive 10. The emergency transponder module may receive an activation signal from TTP 15 or directly from a law enforcement agency transmitter (not shown)

The data receiver 54 and key transmitter 52 may be combined transmitter and receiver (transceiver) for communicating directly with the data archive 10 to generate the shared encryption key and to receive electronic signature data/Diffie-Hellman variables from the data archive 10. The data receiver 54 and key transmitter 52 are shown separately in FIG. 3 for tutorial purposes. Key transmitter 52 provides the periodic shared encryption key signal to data archive 10. Data receiver 54 is provided for receiving sensory signal data from data archive 10 for storage in memory 70 in embodiments not relying on local storage.

The memory 70 of service provider 13 is provided for receiving and storing sensory data signals and signature data signals received via data receiver section 54 from data archive 10. In the exemplary embodiment, encryption signals and electronic signatures from a plurality of data archives 10 may be received and stored in memory 70. Where a vehicle 5 employing a data archive 10 is in a collision/accident, the signature data of memory 54 can be accessed to authenticate the sensory data signals of data archive 10. In the exemplary embodiment of FIG. 3, the memory 70 is a non-volatile memory. In the exemplary embodiment, a portion of memory 54 is reserved for use in processing Diffie-Hellman shared encryption keys for transmission as a provider signal in accordance with a known algorithm.

In this way, the service provider 13 shares an encryption key with data archive 10. The encryption key is utilized by data archive 10 to encrypt sensory data signals for creating authenticating signatures for storage in memory 70 of service provider 13.

IV. Authentication Methods

Figure 4:
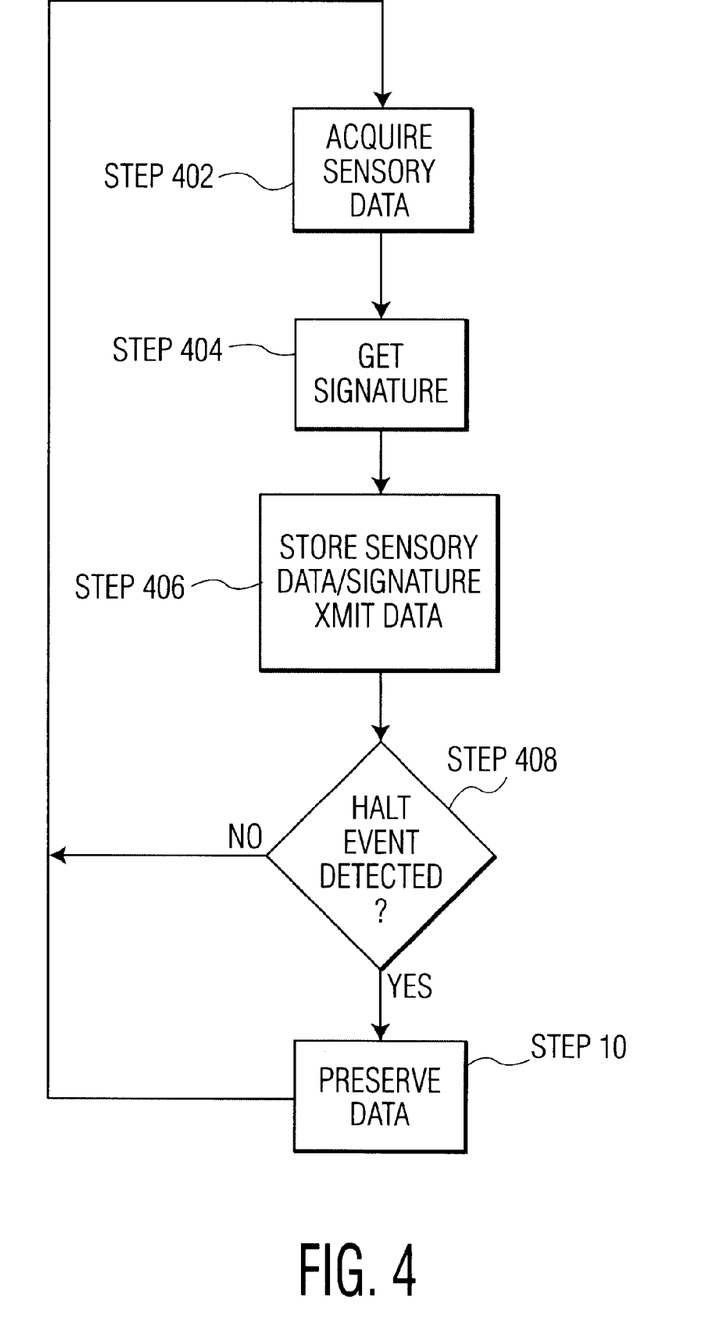
FIG. 4 is a flow chart illustrating a method of continuously archiving sensory signals in accordance with an exemplary embodiment of the present invention.

Referring now to FIG. 4, a exemplary methods for creating an electronic signature to authenticate the storage of sensory data signals are described. Sensory data signals of vehicle data sensors 12 are continuously provided to data archive 10 for generating a data record. As shown in FIG. 4, sensory data is acquired in step 402. An electronic signature of sensory data signals obtained in step 402 is determined at step 404. At step 406, the sensory data stored in secure memory 18 of data archive 10 and the electronic signature/sensory data may be transmitted for storage in service provider 13 or directly the TTP 15. Those skilled in the art will recognize that the electronic signature may also be stored in secure memory 18 before or after it is provided to TTP 15.

At step 408, the data processor 14 determines whether a predetermined sensory data signal (external event, i.e. airbag deployment) has been detected. In the exemplary embodiment, the predetermined sensory data signal is an airbag deployment signal or other signal indicating that the vehicle has been involved in an accident. In an alternative embodiment, the predetermined signal may be provided by an operator via operator interface 32 to disengage data archive 10 from recording sensory data signals of vehicle 5. Upon detection of the predetermined sensory data signal at step 408, a predetermined portion of secure memory 18 is preserved at step 410. In the exemplary embodiment, two time constants are utilized TIME BEFORE and TIME AFTER. These time constants can be user defined to preserve an amount of time before the detected event and after the detected event in step 410. For example, it may be advantageous to review sensory data 10 minutes prior to the event and 15 minutes after (monitoring emergency response performance, paramedics, law enforcement, etc). Any pending sensory data is encrypted and stored and used to generate a signature as a part of this process. Where the predetermined sensory data signal has not been detected, at step 408, the process returns to step 402.

For example, where a vehicle is traveling 60 mph along US. route 1 going south at 4PM EST., the speed data and operational details such as the pressure on the accelerator pedal and break pedal and the direction of the steering wheel are continuously provided to data archive 10, the time, location, and direction data can be derived from the data provided by GPS receiver 40. The data archive may also capture such vehicle data signals as acceleration in six degrees of freedom, breaking time, video of the scene, road conditions and the like. The sensory data signals are then stored, and their corresponding electronic signatures (e.g., the encrypted hash function of the sensory data signals) are transmitted to the TTP 15 for authentication purposes. Upon a collision, the sensors produce the predetermined sensory data signal (e.g. airbag deployment) the data archive 10 would halt data collection operations encrypt and sign any pending sensory data. In this way, data archive could be accessed after the collision to assess the conditions which preceded the accident. The integrity of the data in the archive can be verified by performing the hash function on the data stored in the archive and comparing the results to the digital signature stored locally or held by the TTP 15.

The first method uses a signature, Sig. 1, that is derived from a secret key, $E_{KRt}$ that is stored in the data archive 10. The signature is given by equation (1).

$$E_{KRt}[H(\text{Data}) \oplus \text{clock} \oplus GPS] = \text{Sig. 1} \quad (1)$$

In this example, the result of a hash function applied to the sensory data signal is subject to an "exclusive-or" logic operation along with a clock reference (such as provided by clock reference 60), and a GPS signal and the result is encrypted to derive the digital authorization signature. The data is not encrypted but is stored with the encrypted signature so that any tampering can be detected as long as the encryption key remains secure.

The data may also be encrypted with the signature (Sig. 1) using a second key, EKS, and stored in the memory 18 of the data archive 10, as shown in equation (2).

$$E_{KS}[\text{Data} \| \text{Sig. 1}] \quad (2)$$

Where the data is stored on the data archive 10, $E_{KS}$ is provided for added encryption, for example as provided by a device manufacturer.

In a second embodiment, the hashed sensory data may be sent to the service provider 13 and encrypted using a secret key, $E_{KAUTH}$, belonging to the service provider to produce a signature Sig. 2, as shown in equation (3).

$$E_{KAUTH}[H(\text{Data}) \| \text{timestamp} \| ID_{13}\text{user}] = \text{Sig. 2} \quad (3)$$

The signature, Sig. 2, may be sent back to the archive 10, concatenated with the sensory data payload and stored locally in data archive 10 as shown in equation (4).

$$\text{Data} \| \text{Sig. 2} \quad (4)$$

In such an embodiment as above, prior authorization between service provider 13 and data archive 10 would be required to prevent the integrity of the data from being compromised by a man-in-the-middle (MIM) attack.

A third method uses a shared key that is generated, for example, using the Diffie-Hellman algorithm. In this method, the shared key $E_{Ki}$ is periodically generated at intervals i (e.g. 5 seconds) and is used to generate the signature, Sig. 3, according to equation (5).

$$E_{Ki}[H(\text{Data}) \| \text{timestamp}_i] = \text{Sig. 3} \quad (5)$$

The signature, Sig. 3, may be generated by the TTP 15, if the hashed data value is transmitted to the TTP, or by the data archive 10, or by both the data archive and the TTP. The signature may be stored by the data archive 10 or service provider 13, as described above.

Although the exemplary system is described in terms of a hardware implementation, it is contemplated that some or all of the hardware functionality may be practiced entirely in software running on a data processor of an automobile electrical system. This software may be embodied in a carrier such as magnetic or optical disk or a radio frequency or audio frequency carrier wave.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A vehicle data archive system, comprising:
   an sensory data interface for receiving at least one sensory data signal of the vehicle;
   a data processor which associates the at least one sensory data signal with a data signature, the data signature being derived by the data processor from the sensory data using an encryption key;
   a memory for storing the sensory data signal and associated data signature; and
   an operator interface for selectively deleting at least a portion of the sensory data signal from the memory.

2. The data archive system of claim 1, wherein the at least one sensory data signal is encrypted and stored with the data signature in the memory.

3. The vehicle data archive system of claim 1, further comprising a service provider communications module for transmitting data to and receiving data from a service provider, wherein the vehicle data archive system uses data received from the service provider to generate the encryption key and to generate the data signature which is transmitted to the service provider.

4. The vehicle data archive system of claim 1, further comprising a service provider communications module for transmitting data to a service provider, wherein the vehicle data archive system transmits the data signature to the service provider.

5. The vehicle data archive system of claim 1, further comprising a GPS communication module responsive to global positioning signals for providing information identifying a location of the vehicle data archive system.

6. The vehicle data archive system of claim 1, wherein the memory includes circular buffer memory for storing the sensory data.

7. The vehicle data archive system of claim 6, wherein the at least one sensory data signal includes a plurality of sensory data signals and the data processor is responsive to an event indicated by a predetermined one of the plurality of sensory data signals to generate the signature data for a predetermined amount of the sensory data stored in the circular buffer memory.

8. The vehicle data archive system of claim 7, wherein the predetermined amount of sensory data is defined by two separate time constants, representing an amount of data stored before the event (TIME BEFORE) and an amount of data stored after the event (TIME AFTER), respectively.

9. The vehicle data archive system of claim 1, further comprising an emergency transponder for emitting a signal for use in locating the data archive.

10. A vehicle data archive system, comprising:
an sensory data interface for receiving at least one sensory data signal of the vehicle;
a data processor which encrypts the at least one sensory data signal using an encryption key to produce an encrypted sensory data signal;
a memory for storing the encrypted sensory data signal; and
a communications module for transmitting data to and receiving data from a service provider, wherein the vehicle data archive system uses data received via the communications module to generate the encryption key.

11. The vehicle data archive system of claim 10, wherein the data processor further includes means for generating a digital signature from the stored encrypted sensory data signal and for transmitting the digital signature value to the service provider using the communications module.

12. The vehicle data archive system of claim 11, wherein the data received via the communications module that is used to generate the encryption key is provided by a trusted third party.

13. The vehicle data archive system of claim 12, wherein the data received via the communications module that is used to generate the encryption key is received from the service provider, wherein the service provider receives the data from the trusted third party.

14. The vehicle data archive of claim 10, further comprising:
a power supply for powering the data archive when vehicle power is disrupted; and
a sound producing transducer for alerting an operator that the local power supply is in use and to assist in locating the archive.

15. The vehicle data archive of claim 14, further comprising:
an emergency transponder for providing an electronic signal for locating the data archive.

16. The vehicle data archive of claim 15, wherein the emergency transponder is responsive to a signal received by the communications module to provide the electronic signal for locating the data archive.

17. An automobile data archive system, comprising:
an instrumentation interface for receiving at least one sensory data signal of the automobile;
a circular buffer memory for storing the at least one sensory data signal;
a first transponder responsive to a periodic provider signal of a service provider for obtaining a corresponding periodic encryption key and for returning an encrypted data signature to the service provider; and
a data processor for creating the encrypted data signature with the encryption key to authenticate the at least one sensory signal,
wherein the signature provided to the service provider serves to authenticate the archive of the at least one sensory data signal.

18. The automobile data archive system of claim 17 wherein the data processor applies a hash function to the at least one sensory data signal to produce a hash value and encrypts the hash value using an encryption key to generate the signature data.

19. The automobile data archive system of claim 18, wherein the periodic encryption key is provided by the service provider.

20. The automobile data archive system of claim 18, wherein the periodic encryption key is a shared encryption key generated from data received from the service provider.

21. The automobile data archive system of claim 17 further comprising a global positioning system (GPS) communication module responsive to global positioning signals for identifying a cartographic location of the modular data archive.

22. The automobile data archive system of claim 21, wherein data archive system receives time reference data from the GPS communications module and uses the time reference data to generate the encrypted data signature.

23. The vehicle data archive system of claim 17, wherein a the at least one sensory data signal includes a plurality of sensory data signals and the data processor is responsive to a predetermined one of the plurality of sensory data signals to generate the encrypted data signature from the stored at least one sensory data signal.

24. A vehicle data archive system, comprising:
means for receiving at least one sensory data signal from the vehicle;
means for storing the at least one sensory data signal;
means for obtaining an encryption key; and
means for creating an electronic signature with the encryption key to authenticate the stored at least one sensory data signal.

25. A method of authenticating at least one sensory data signal of a vehicle data archive, comprising:
receiving at least one sensory data signal from the vehicle;
storing the at least one sensory data signal;
obtaining an encryption key; and
creating an electronic signature with the encryption key to authenticate the stored at least one sensory data signal.

* * * * *

UNITED STATES PATENT AND TRADEMARK OFFICE
CERTIFICATE OF CORRECTION

PATENT NO. : 6,490,513 B1
DATED : December 3, 2002
INVENTOR(S) : Robert Fish et al.

It is certified that error appears in the above-identified patent and that said Letters Patent is hereby corrected as shown below:

<u>Title page,</u>
Item [73], Assignee, "Matsushita Electrical Industrial Co., Ltd., Osaka (JP)" should read -- Matsushita Electric Insdustrial Co., Ltd., Osaka (JP) --

Item [75], Inventors, "Mahfuz Rahman" should read -- Mahfuzur Rahman --.

Signed and Sealed this

Tenth Day of June, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,490,513 B1  
DATED        : December 3, 2002  
INVENTOR(S)  : Robert Fish et al.

It is certified that error appears in the above-identified patent and that said Letters Patent is hereby corrected as shown below:

<u>Title page,</u>  
Item [73], Assignee, "Matsushita Electrical Industrial Co., Ltd., Osaka (JP)" should read -- Matsushita Electric Industrial Co., Ltd., Osaka (JP) --

Item [75], Inventors, "Mahfuz Rahman" should read -- Mahfuzur Rahman --.

This certificate supersedes Certificate of Correction issued June 10, 2003.

Signed and Sealed this

Nineteenth Day of August, 2003

JAMES E. ROGAN  
*Director of the United States Patent and Trademark Office*